United States Patent
Parent et al.

(10) Patent No.: US 10,795,120 B2
(45) Date of Patent: Oct. 6, 2020

(54) MINIATURE WIDE-ANGLE IMAGING LENS

(71) Applicant: 6115187 Canada, Inc., Montreal (CA)

(72) Inventors: Jocelyn Parent, Montreal (CA); Simon Thibault, Quebec (CA); Patrice Roulet, Montreal (CA); Hu Zhang, Montreal (CA); Pascale Nini, Montreal (CA); Pierre Konen, Saint-Bruno (CA)

(73) Assignee: ImmerVision, Inc., Montreal, Quebec (CA)

( * ) Notice: Subject to any disclaimer, the term of this patent is extended or adjusted under 35 U.S.C. 154(b) by 0 days.

(21) Appl. No.: 16/432,180

(22) Filed: Jun. 5, 2019

(65) Prior Publication Data

US 2019/0285847 A1    Sep. 19, 2019

Related U.S. Application Data

(63) Continuation of application No. 15/384,900, filed on Dec. 20, 2016.

(60) Provisional application No. 62/298,795, filed on Feb. 23, 2016, provisional application No. 62/387,409, filed on Dec. 23, 2015.

(51) Int. Cl.
| | |
|---|---|
| *G02B 9/00* | (2006.01) |
| *G02B 9/08* | (2006.01) |
| *G02B 13/00* | (2006.01) |
| *G02B 13/06* | (2006.01) |
| *G02B 9/62* | (2006.01) |
| *G02B 5/00* | (2006.01) |
| *G02B 5/20* | (2006.01) |
| *G02B 9/64* | (2006.01) |

(52) U.S. Cl.
CPC ............ *G02B 13/001* (2013.01); *G02B 5/005* (2013.01); *G02B 5/208* (2013.01); *G02B 9/62* (2013.01); *G02B 9/64* (2013.01); *G02B 13/0045* (2013.01); *G02B 13/06* (2013.01)

(58) Field of Classification Search
CPC ...... G02B 13/001; G02B 5/005; G02B 5/208; G02B 9/64
See application file for complete search history.

(56) References Cited

U.S. PATENT DOCUMENTS

| | | | |
|---|---|---|---|
| 7,944,620 B2 | 5/2011 | Wang et al. | |
| 9,696,520 B2 | 7/2017 | Liang et al. | |
| 2010/0002154 A1* | 1/2010 | Hua ...................... | G02B 13/00 349/11 |
| 2010/0142062 A1 | 6/2010 | Asami et al. | |
| 2012/0212839 A1 | 8/2012 | Hsu et al. | |

(Continued)

OTHER PUBLICATIONS

Int'l Search Report dated Apr. 10, 217 in Int'l Application No. PCT/IB2016/001808.

(Continued)

*Primary Examiner* — Alicia M Harrington
(74) *Attorney, Agent, or Firm* — Panitch Schwarze Belisario & Nadel LLP

(57) ABSTRACT

A miniature wide-angle imaging lens has a miniaturization ratio, of a total track length from the center of a first surface to a focal plane by an image circle diameter, with a value less than 3.0. The imaging lens includes, starting from an object side of the lens, a first group of at least three optical elements, a second group including an aperture stop and an optical element immediately in front of or behind the aperture stop, and a third group of at least two optical elements.

7 Claims, 5 Drawing Sheets

(56) References Cited

U.S. PATENT DOCUMENTS

| | | |
|---|---|---|
| 2012/0314296 A1 | 12/2012 | Shabtay et al. |
| 2013/0114150 A1 | 5/2013 | Kwon |
| 2013/0308206 A1 | 11/2013 | Hsu et al. |
| 2014/0029115 A1 | 1/2014 | Liao et al. |
| 2014/0118526 A1 | 5/2014 | Sutton et al. |
| 2014/0204477 A1 | 7/2014 | Asami et al. |
| 2014/0218597 A1 | 8/2014 | Lee |
| 2014/0226222 A1 | 8/2014 | Hsieh et al. |
| 2014/0285906 A1 | 9/2014 | Huang |
| 2015/0116573 A1 | 4/2015 | Liao |
| 2015/0253542 A1 | 9/2015 | Lin et al. |
| 2015/0268446 A1 | 9/2015 | Chen et al. |
| 2016/0004926 A1 | 1/2016 | Kerner et al. |

OTHER PUBLICATIONS

International Preliminary Report on Patentability dated Jul. 5, 2018 in International Application No. PCT/IB2016/001808.

* cited by examiner

MINIATURE WIDE-ANGLE IMAGING LENS

CROSS-REFERENCE TO RELATED APPLICATIONS

This application is a continuation application of U.S. patent application Ser. No. 15/384,900, filed Dec. 20, 2016, entitled "Miniature Wide-Angle Imaging Lens," currently, which claims the benefit of U.S. Provisional Patent Application No. 62/387,409, filed Dec. 23, 2015, entitled "Miniature wide-angle imaging lens," now, and U.S. Provisional Patent Application No. 62/298,795, filed Feb. 23, 2016, entitled "Miniature wide-angle imaging lens," now, the entire contents of all of which are incorporated by reference herein.

BACKGROUND OF THE INVENTION

The present invention relates to optical lenses and more particularly to miniature lenses having a wide-angle field of view.

For most applications requiring wide-angle imaging, larger lens constructions having a miniaturization ratio (i.e., a total track length over an image circle diameter) greater than 3.0 are often used. However, for consumer applications, especially with mobile devices, the trend is that the lens thicknesses are becoming thinner while the sensor sizes are becoming larger. Accordingly, a new kind of wide-angle lenses with a miniaturization ratio less than 3.0 are required.

Previously suggested miniature wide-angle lenses, such as that described in "Consumer electronic optics: how small can a lens be: the case of panomorph lenses" published in "Proc. SPIE 9192, Current Developments in Lens Design and Optical Engineering XV, 91920H," or as in U.S. Pat. No. 8,248,715 or U.S. Pat. App. Pub. Nos. 2014/0029115, 2013/0308206, 2014/0226222, 2014/0285906, 2015/0253542, 2015/0268446 or 2012/0212839 were designed for previous generations of sensors having smaller sizes and larger pixels. These lenses had lower performance requirements, especially regarding image quality and aperture size. For these existing lens constructions, a total of three to six optical elements were enough to meet the required performances for these sensors. For the existing wide-angle 6-element lenses, a symmetric construction using 3 elements in front of the stop and 3 elements behind the stop has been used. However, with new larger sensors and smaller pixels, more complex wide-angle lens constructions using six elements with asymmetric constructions around the stop or using seven or more elements must be designed to achieve the required performances.

One of the challenges to achieve good imaging performance over the whole field of view of a miniature wide-angle lens is the change of relative illumination from the center to the edge of the field of view. In wide-angle lenses, the relative illumination is usually maximum in the center and drops continuously toward the edge of the field of view. The consequence of lower illumination toward the edge is a lower image quality at the edge due to increased diffraction effects and additional sensor noise at the edges.

Another challenge to achieve good imaging performance over the whole field of view of a miniature wide-angle lens is a drop of the modulation transfer function (MTF) from the center to the edge of the field of view. In wide-angle lenses, the image MTF is usually maximum in the center and drops continuously toward the edge of the field of view. The consequence of lower MTF toward the edge is a lower image quality at the edge.

BRIEF SUMMARY OF THE INVENTION

To overcome all the previously mentioned issues, embodiments of the current invention describe miniature wide-angle imaging lenses having a miniaturization ratio (i.e., total track length from the center of the first surface to the focal plane over the image circle diameter) having a value less than 3.0 while maintaining a good balance between image quality parameters, including MTF, relative illumination, and resolution. The imaging lens construction, in order from the object space to the image space, preferably includes a first group of elements, a second group of elements, and a third group of elements.

The first group of elements, preferably including all the elements in front of the second group, has a negative optical power in the paraxial region and preferably includes at least three optical lenses. Of these at least three optical lenses, the first lens on the object side is generally a negative meniscus lens with a surface on the object side and accepting light from an opening angle of at least 100° and generally between 120° to 280°.

The second group of elements preferably includes an aperture stop and a single optical lens immediately in front of or behind the aperture stop. The single optical lens of the second group is preferably a positive lens.

The third group of elements preferably includes at least two optical lenses after the second group. Of these at least two optical lenses, there is generally at least one positive element and at least one negative element. The last lens element on the image side has a surface on the image side transmitting light to an opening angle of at least 40°.

In an embodiment of the current invention, the miniature optical lens has six optical elements, split as three, one, and two elements respectively for the first, second, and third groups. In another embodiment of the current invention, the miniature optical lens has seven optical elements in it, split as three, one, and three elements respectively for the first, second, third groups. In another embodiment of the current invention, the miniature optical lens has eight optical elements in it, split as four, one, and three elements respectively for the first, second and third groups.

In some embodiments of the current invention, the targeted resolution curve of the miniature wide-angle lens is configured to offset, at least in part, the drop of relative illumination from the miniature wide-angle lens by increasing the number of pixels imaged in the zone where the relative illumination is lower.

In some other embodiments of the current invention, the targeted resolution curve of the miniature wide-angle lens is configured to offset, at least in part, the drop of MTF from the miniature wide-angle lens by increasing the number of pixels imaged in the zone where the MTF is lower.

In some other embodiments of the current invention, the targeted resolution curve of the miniature wide-angle lens is configured as the optimal curve to produce the highest relative illumination and MTF values combination and hence produce the optimal image quality for the whole lens plus camera system.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
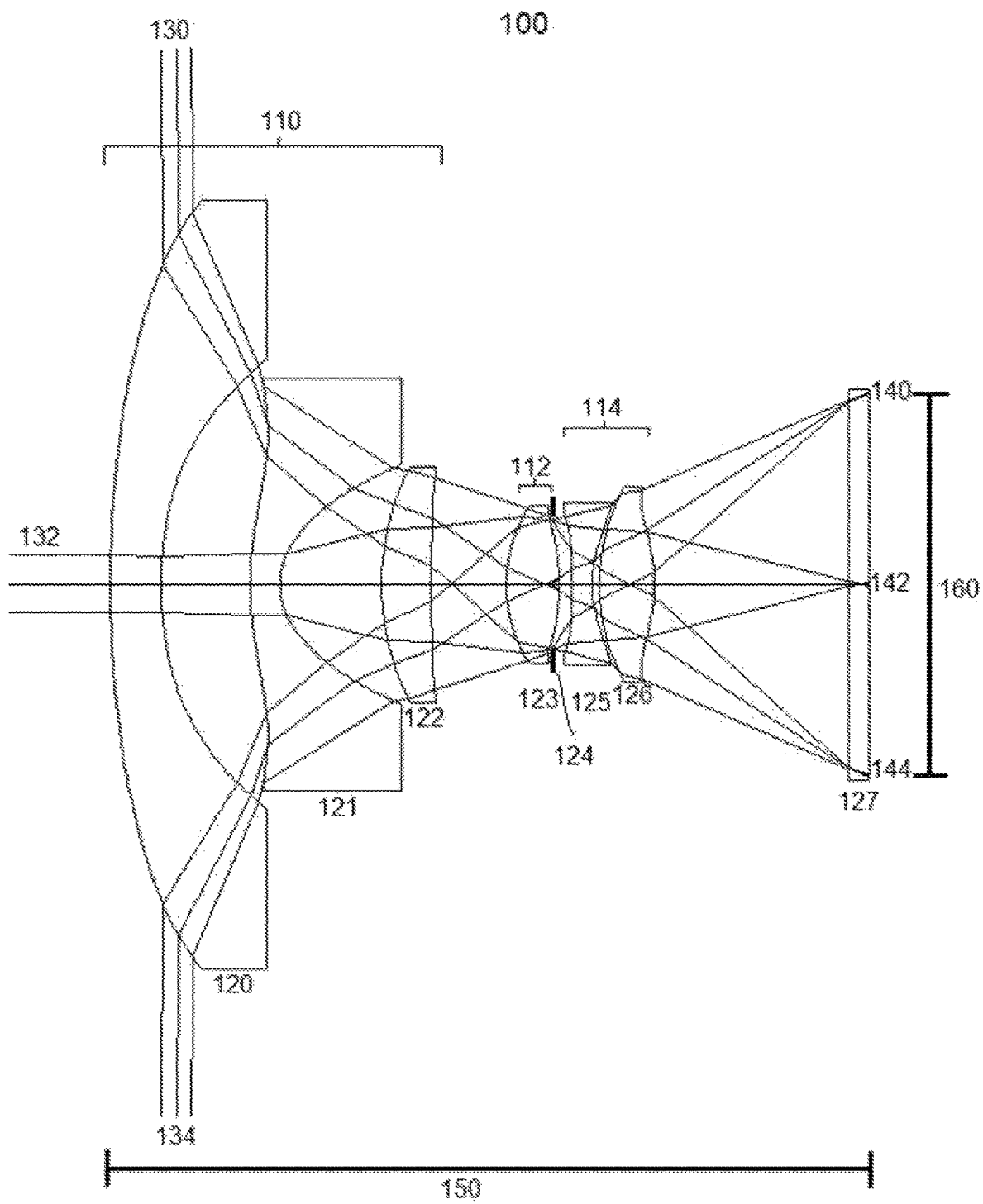
FIG. 1 is a first preferred embodiment of a miniature wide-angle lens with six total lens elements.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

FIG. 1 shows a first embodiment of the present invention with an optical layout for a design having six optical elements in an asymmetric configuration around the stop, having four optical elements before the stop and two optical elements after the stop. The lens 100 is comprised of the three groups 110, 112 and 114. In this embodiment of the miniature wide-angle lens 100, the first group 110 from the object space is made of lenses 120, 121 and 122. The first group has a negative total optical power. The second group 112 includes an aperture stop 124 and a single positive lens 123. The second group 112 has positive optical power. In this embodiment of the miniature wide-angle lens 100, the third group 114 has two optical elements 125, 126 and has a negative total optical power.

Light entering the miniature lens 100 hits a first surface of element 120 from all directions between an upper angle 130 and a lower angle 134. In this example embodiment of FIG. 1, a total field of view around the central field 132 of the lens 100 is 180°, but any total field of view over 100° can be considered as a wide-angle lens according to the present invention.

The light then passes through all the elements 120, 121, 122, of the first group 110, the single lens 123 and the aperture stop 124 of the second group 112, and the elements 125 and 126 of the third group 114 to reach an IR filter and image sensor 127. More specifically, the light beam from direction 130 reaches the sensor 127 at position 144, the light from direction 132 reaches the sensor 127 at position 142, and the light from direction 134 reaches the sensor 127 at position 140. For all beams of light 130, 132 and 134, the chief-ray is defined as the middle ray of the three rays drawn because it passes through the center of the aperture stop 124. In this example embodiment, the angle of the cone of light formed by the chief-rays reaching the sensor plane at positions 140 and 144 is over 40° to minimize the dimensions of the lens 100. When measured with respect to the chief-ray reaching the sensor 127 at position 142, which represents the optical axis of the lens 100, the chief-ray angle of the extreme rays reaching the sensor at position 140 or 144 are over 20°.

The lens 100 has a total track length 150, which is a measure from the first surface on the object side of lens 120 to the image sensor 127, and forms an image having a diameter 160, which is a distance on the sensor 127 between the position 140 and the position 144 where the light beams from the lower and the upper fields 130, 134 reach the sensor 127. The miniaturization ratio is calculated by dividing the total track length 150 over the footprint diameter 160 and is less than 3.0 for any miniature lens according to the present invention and could even be less than 2.0 for an extreme miniature lens.

Figure 2:
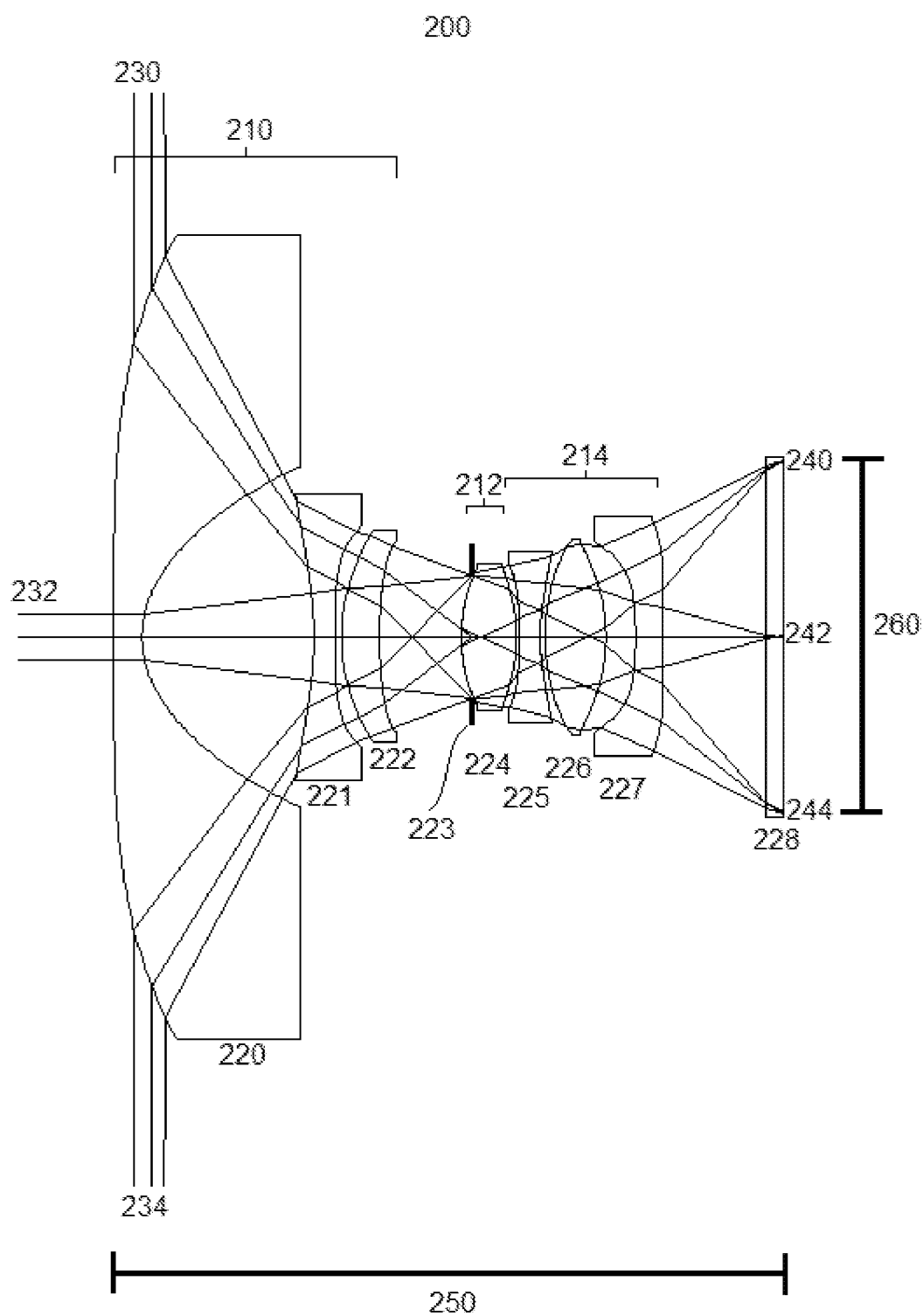
FIG. 2 is a second preferred embodiment of a miniature wide-angle lens with seven total lens elements.

FIG. 2 shows an embodiment of the present invention with an optical layout for a design having seven optical elements. The lens 200 is comprised of the three groups 210, 212 and 214. In this embodiment of the miniature wide-angle lens 200, the first group 210 from the object space is made of lenses 220, 221, and 222. The first group 210 has a negative total optical power. The second group 212 includes the aperture stop 223 and a single positive lens 224. The second group 212 has positive optical power. In this embodiment of the miniature wide-angle lens 200, the third group 214 has three optical elements 225, 226, 227 and has a negative total optical power.

Light entering the miniature lens 200 hits the first surface of element 220 from all directions between the upper angle 230 and the lower angle 234. In this example embodiment of FIG. 2, the total field of view around the central field 232 is 180°, but any total field of view over 100° can be considered as a wide-angle lens according to the present invention.

The light then passes through all the elements 220, 221, 222 of the first group 210, the aperture stop 223 and positive lens 224 of the second group 212, and the elements 225, 226 and 227 of the third group 214 to reach the IR filter and image sensor 228. More specifically, the light beam from direction 230 reaches the sensor at position 244, the light from direction 232 reaches the sensor at position 242, and the light from direction 234 reaches the sensor at position 240. In this example, an angle of the cone of light formed by the chief-rays reaching the sensor plane at positions 240 and 244 is over 40° to minimize the dimensions of the lens 200. When measured with respect to the chief ray reaching the sensor 228 at position 242, which represents the optical axis of the lens 200, the chief-ray angle of the extreme rays is over 20°.

The lens 200 has a total track length 250, which is a measure from the first surface on the object side of lens 220 to the image sensor 228 and forms an image having a diameter 260, which is the distance on the sensor between the position 240 and the position 244 where the light beams from the upper and the lower fields 230, 234 reach the sensor. The miniaturization ratio is calculated by dividing the total track length 250 over the footprint diameter 260 and is less than 3.0 for any miniature lens according to the present invention, and could even be less than 2.0 for an extreme miniature lens.

Figure 3:
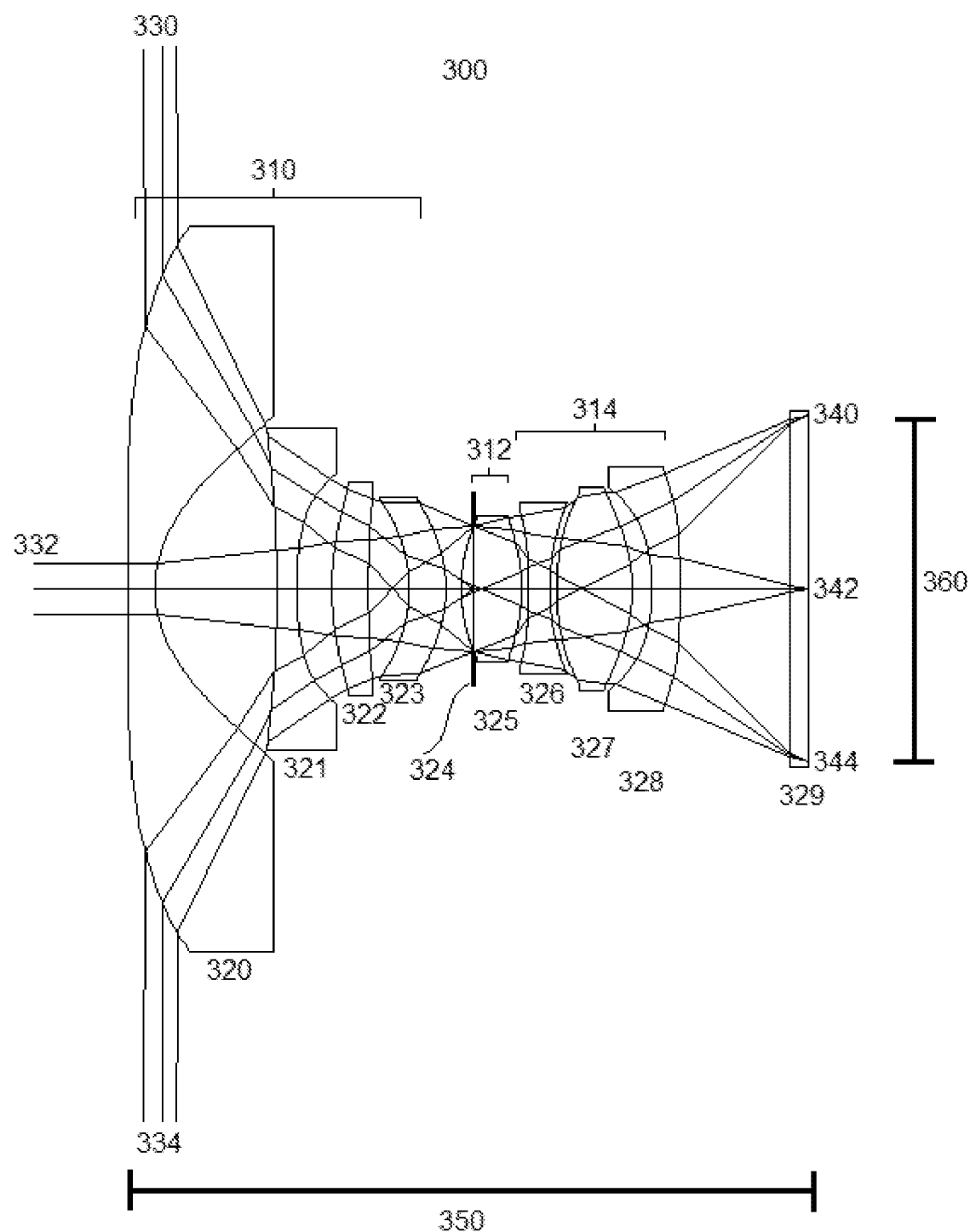
FIG. 3 is third preferred embodiment of a miniature wide-angle lens with eight total lens elements.

FIG. 3 shows an embodiment of the present invention with an optical layout for a design having eight optical elements. The lens is comprised of the three groups 310, 312 and 314. In this embodiment of the miniature wide-angle lens, the first group 310 from the object space is made of lenses 320, 321, 322 and 323. The first group has a negative total optical power. The second group 312 includes the aperture stop 324 and a single positive lens 325. The second group 312 has positive optical power. In this embodiment of the miniature wide-angle lens 300, the third group 314 has three optical elements 326, 327, 328 and has a negative total optical power.

Light entering the miniature lens 300 hit the first surface of element 320 from all directions between the upper angle 330 and the lower angle 334. In this example embodiment of FIG. 3, the total field of view around the central field 332 is 180°, but any total field of view over 100° can be considered as a wide-angle lens according to the present invention.

The light then passes through all the elements 320, 321, 322, 323 of the first group 310, the aperture stop 324 and lens 325 of the second group 312, and the elements 326, 327 and 328 of the third group 314 to reach the IR filter and image sensor 329. More specifically, the light beam from direction 330 reaches the sensor 329 at position 344, the light from direction 332 reaches the sensor 329 at position 342, and the light from direction 334 reaches the sensor 329 at position 340. In this example, the angle of the cone of light formed by the chief-rays reaching the sensor plane at positions 340 and 344 is over 40° to minimize the dimensions of the lens. When measured with respect to the chief ray reaching the sensor at position 342, which represents the optical axis of the lens, the chief-ray angle of the extreme rays is over 20°.

The lens has a total track length 350, which is a measure from the first surface on the object side of lens 320 to the image sensor 329, and forms an image having a diameter 360 which is a distance on the sensor 329 between the position 340 and the position 344 where the light beams from the upper and the lower fields 330, 334 reach the sensor. The miniaturization ratio is calculated by dividing the total track length 250 over the footprint diameter 260 and is less than 3.0 for any miniature lens according to the present invention and could even be less than 2.0 for an extreme miniature lens.

In some embodiments of the present invention, all of the elements inside the miniature wide-angle lenses are made of plastic materials in part to ease the mass-production or lower the costs. In some other embodiments of the present invention, the miniature wide-angle lens consist of at least one glass element to improve the optical performances of the miniature wide-angle lens or to increase the rigidity of when the glass element is the first element.

Figure 4:
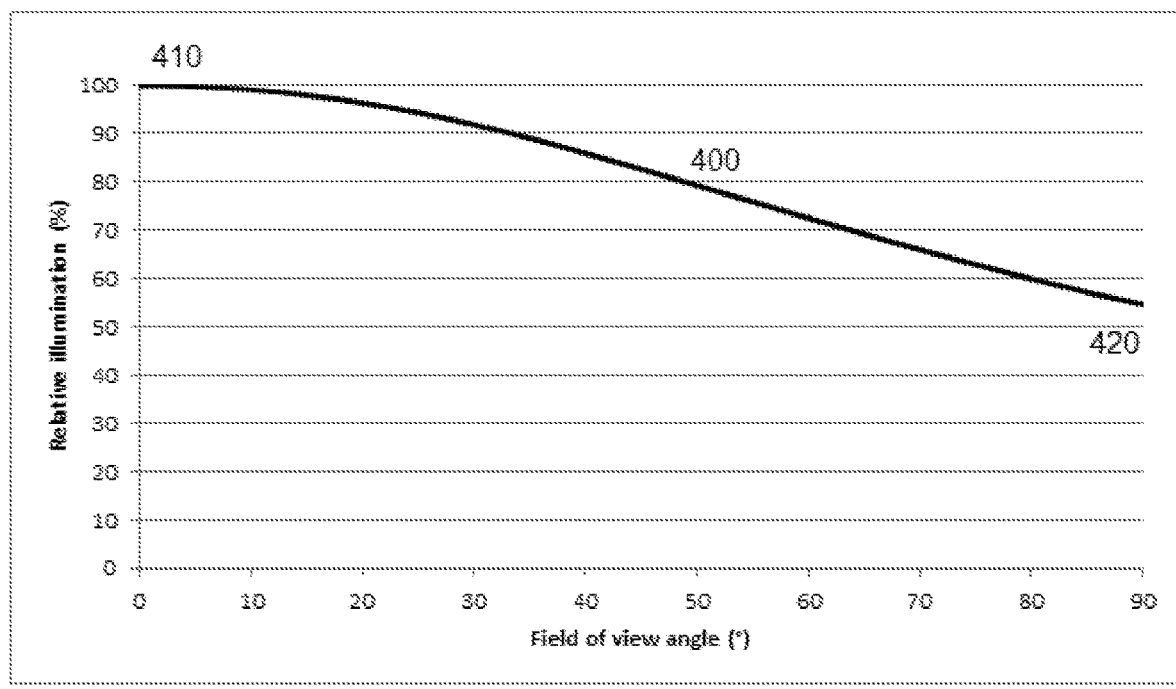
FIG. 4 is an example of a typical relative illumination curve of a miniature wide-angle lens.

FIG. 4 shows a typical relative illumination curve 400 for a miniature wide-angle lens according to embodiments of the present invention. The exact values of the relative illumination with respect to the field of view vary between each embodiment of the present invention, but the overall shape having a value around 100% at 0° shown at center 410 and under 80% at the maximum field angle shown at position 420 is present in all families of miniature wide-angle lenses according to the present invention.

Figure 5:
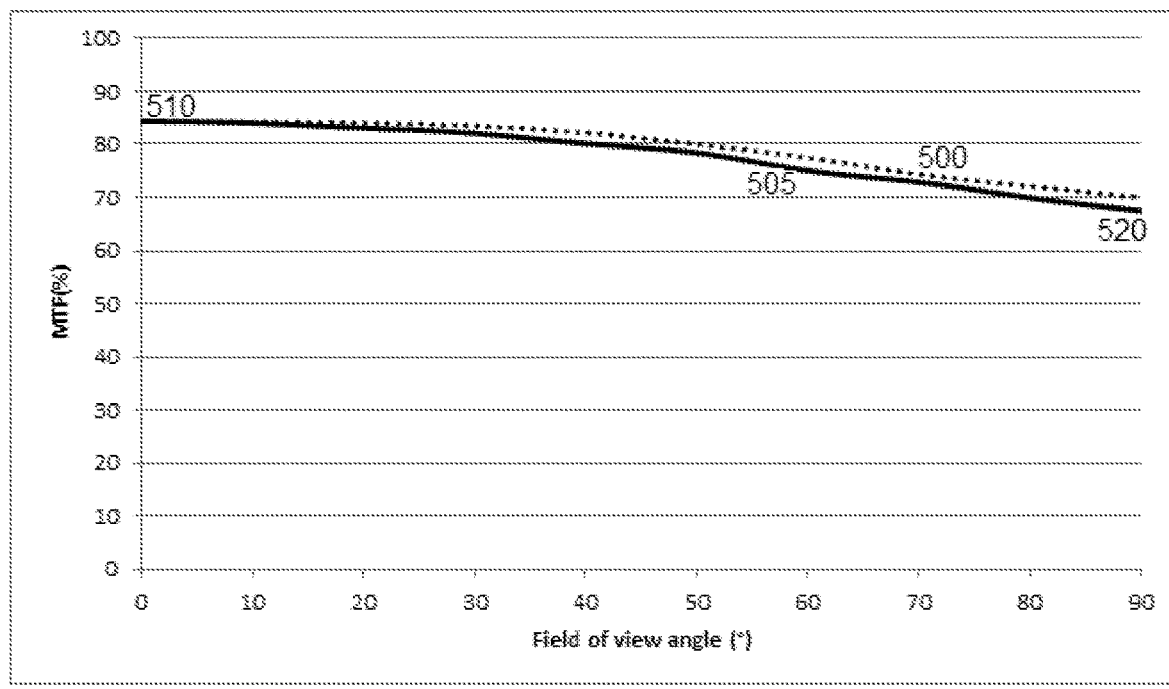
FIG. 5 is an example of a typical MTF curve of a miniature wide-angle lens.

FIG. 5 shows a typical sagittal MTF curve 500 and tangential MTF curve 505 for a miniature wide-angle lens according to embodiments of the present invention. The exact values of the MTF with respect to the field of view vary between each embodiment of the present invention and also vary according to the spatial frequency at which the MTF is calculated, but the overall shape having a higher value at 0° shown at center 510 than at the edge shown at position 520 is present in all families of miniature wide-angle lenses according to the present invention.

Figure 6:
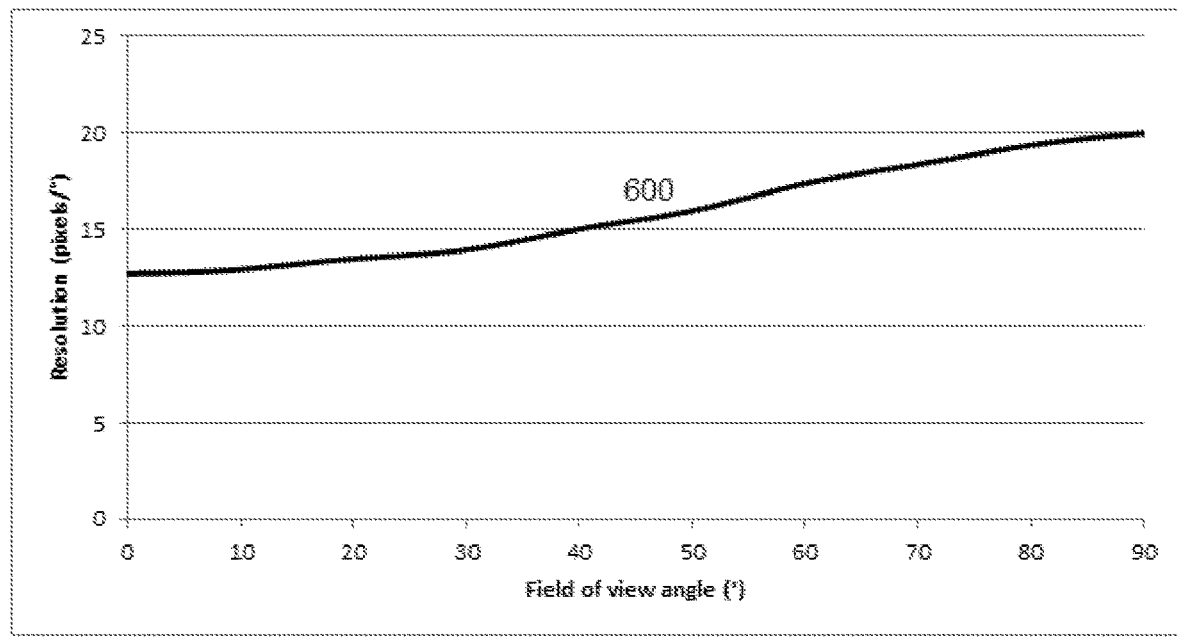
FIG. 6 is an example of a targeted resolution curve used to at least partially compensate the relative illumination or at least partially compensate the MTF according to certain embodiments of the present invention.

FIG. 6 shows an example targeted resolution curve 600 for a miniature wide-angle lens according to embodiments of the present invention where the targeted resolution is non-linear and a higher number of pixels per degree is intentionally present in a part of the image. In some embodiments of the miniature wide-angle, the shape of the targeted resolution curve is intentionally designed to compensate for the drop of relative illumination seen in FIG. 4. In some other embodiments of the miniature wide-angle lens, the shape of the targeted resolution is intentionally designed to compensate for the drop of MTF seen in FIG. 5. In the zone where the resolution is higher, there are more pixels of the sensors used to image a given angle of the object space. By having more imaging pixels in this zone, this compensates for the lower image quality in this zone either due to the lower relative illumination or the lower MTF. The final resulting image can then be processed to create a resulting image with constant image quality across the whole field of view.

Figure 7:
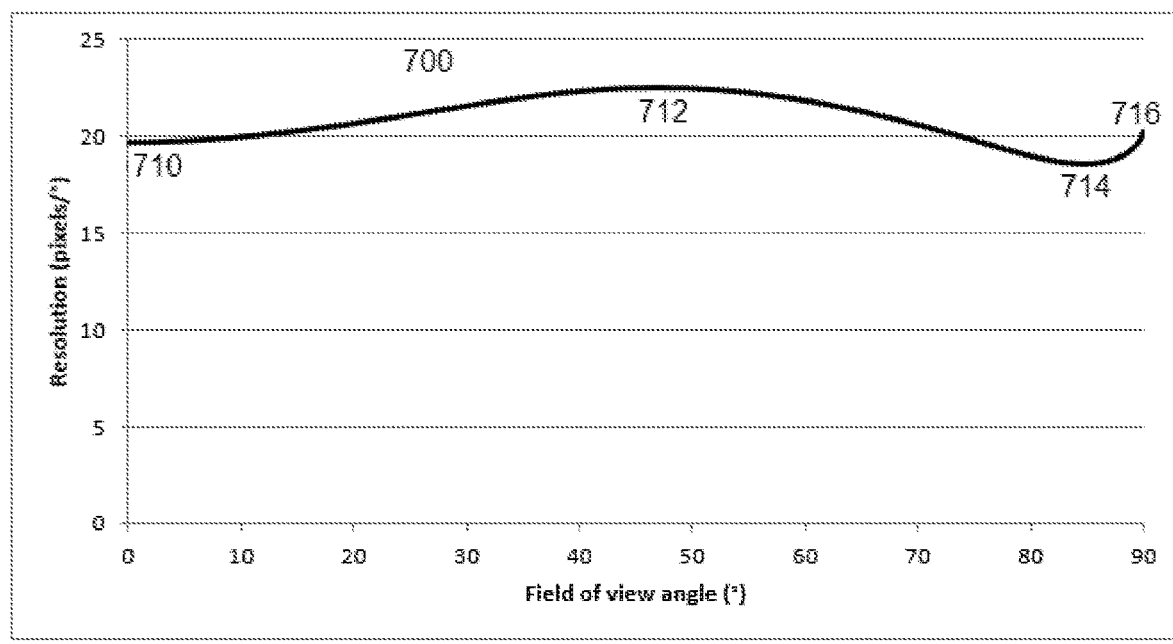
FIG. 7 is an example of a targeted resolution curve chosen to produce the highest relative illumination in the whole field of view while keeping the highest MTF according to certain embodiments of the present invention.

FIG. 7 shows another example embodiment of a non-linear targeted resolution curve 700 for a miniature wide-angle lens according to the present invention. The targeted resolution curve is chosen to have an upward curve between the center resolution value 710 and a maximum 712 (number of pixels/degree), followed by a downward curve between the maximum 712 and a region near the edge of the field of view around position 714. This downward curve between maximum value 712 and position 714 allows the lens system to have a higher relative illumination value toward the edge of the field of view by having a lower object to image magnification ratio in that region and hence redirecting the same quantity of light from an object to a smaller region in the image with more illumination.

In some embodiments of a miniature wide-angle lens according to the present invention, the resolution curve has a change of direction at the edge of the field of view 716. This change of direction is an upward trend if it is preceded by a downward trend and it is a downward trend if it is preceded by an upward trend. This change of direction allows for a closer value of resolution in pixels/degree in the center 710 and at the edge 716, creating the best balance of MTF between the center 710 and the edge 716.

Combined together, the downward curve between maximum value 712 and position 714 allowing higher relative illumination and the change of direction in the curve between position 714 and edge provides 716 the best image quality on the lens and camera system. The more balanced relative illumination creates less sensor noise in the images due do illumination differences and less difference of diffraction effects on the image quality due to the variable f/# across the field of view. For the more balanced MTF, thanks to the change of direction between position 614 and edge 616, it is directly related to the image quality of the lens.

All of the above are figures and examples of miniatures wide-angle lenses. They are examples of families of constructions having three groups and at least six optical elements. Furthermore, the miniature wide-angle lenses can be optimized according to a function which at least includes the relative illumination, the resolution and the MTF. Similar constructions are possible and the three examples presented should not limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A miniature wide-angle optical apparatus comprising:
   a light-receiving first surface;
   a focal plane;
   a total track length measured from a center of the first surface to the focal plane;
   a miniaturization ratio with a value less than 3.0, the miniaturization ratio being a ratio of the total track length divided by an image circle diameter; and
   a non-linear targeted resolution to intentionally create a zone in an image captured by the miniature wide-angle optical apparatus with a lower or higher object to image magnification compared to linear targeted resolution, the lower or higher object to image magnification being used to compensate, at least in part, for a lower image quality due to at least one of a drop of relative illumination or a drop of MTF in a zone of the image,
   an opening angle of light entering the optical apparatus being over 100°.

2. The miniature wide-angle optical apparatus of claim 1, wherein the optical apparatus is configured to create a resulting image with a constant image quality across a whole field of view.

3. The miniature wide-angle optical apparatus of claim 1, wherein a targeted resolution curve has a change of direction near an edge of a field of view.

4. The miniature wide-angle optical apparatus of claim 1, wherein an angle of chief-rays reaching the focal plane is over 20° from an optical axis of the optical apparatus.

5. The miniature wide-angle optical apparatus of claim 1, further comprising a plurality of optical elements, at least one of the plurality of optical elements defining the first surface.

6. The miniature wide-angle optical apparatus of claim 5, wherein at least one of the optical elements is made of glass.

7. The miniature wide-angle optical apparatus of claim 1, wherein the miniaturization ratio value is less than 2.0.

* * * * *